(12) United States Patent
Tomihisa

(10) Patent No.: US 10,275,196 B2
(45) Date of Patent: Apr. 30, 2019

(54) IMAGE FORMING APPARATUS THAT RECEIVES BIBLIOGRAPHIC INFORMATION INCLUDING IDENTIFICATION INFORMATION OF PRINT DATA TRANSMITTED TO OTHER IMAGE FORMING APPARATUSES AND OBTAINS USER INFORMATION ASSOCIATED WITH THE PRINT DATA, AND RELATED DISPLAY METHOD AND NON-TRANSITORY COMPUTER-READABLE STORAGE MEDIUM STORING PROGRAM

(71) Applicant: CANON KABUSHIKI KAISHA, Tokyo (JP)

(72) Inventor: Taishi Tomihisa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/895,032

(22) Filed: Feb. 13, 2018

(65) Prior Publication Data

US 2018/0239569 A1  Aug. 23, 2018

(30) Foreign Application Priority Data

Feb. 20, 2017 (JP) ................. 2017-029230

(51) Int. Cl.
*G06F 3/12* (2006.01)

(52) U.S. Cl.
CPC .......... *G06F 3/1258* (2013.01); *G06F 3/1203* (2013.01); *G06F 3/1222* (2013.01);
(Continued)

(58) Field of Classification Search
CPC combination set(s) only.
See application file for complete search history.

(56) References Cited

U.S. PATENT DOCUMENTS

| 2015/0205551 A1* | 7/2015 | Dohi ................ G06F 3/1238 358/1.15 |
| 2015/0324675 A1* | 11/2015 | Morii ................ H04N 1/4413 358/1.14 |

(Continued)

FOREIGN PATENT DOCUMENTS

JP   2012-254618 A   12/2012

*Primary Examiner* — Helen Zong
(74) *Attorney, Agent, or Firm* — Venable LLP

(57) ABSTRACT

A processor of an image forming apparatus receives bibliographic information including identification information of print data transmitted to other image forming apparatuses, obtains user information associated with the print data stored in the other image forming apparatuses, based on the received bibliographic information, and obtains user information associated with print data stored in a storage unit of the image forming apparatus. A display unit displays a first screen that includes an icon of a user associated with the print data stored in at least one of the other image forming apparatuses and an icon of a user associated with the print data stored in the storage unit, and a second screen that includes identification information of print data associated with a user corresponding to an icon selected on the first screen. Image formation is executed based on the print data corresponding to identification information selected on the second screen.

18 Claims, 10 Drawing Sheets

(52) U.S. Cl.
CPC .......... *G06F 3/1238* (2013.01); *G06F 3/1262* (2013.01); *G06F 3/1267* (2013.01); *G06F 3/1288* (2013.01)

(56) References Cited

U.S. PATENT DOCUMENTS

2016/0154611 A1\* 6/2016 Sato ...................... G06F 3/1204
358/1.15
2017/0161000 A1\* 6/2017 Masuda ................ G06F 3/1203
2017/0285909 A1\* 10/2017 Ono .................... G06F 3/04812

\* cited by examiner

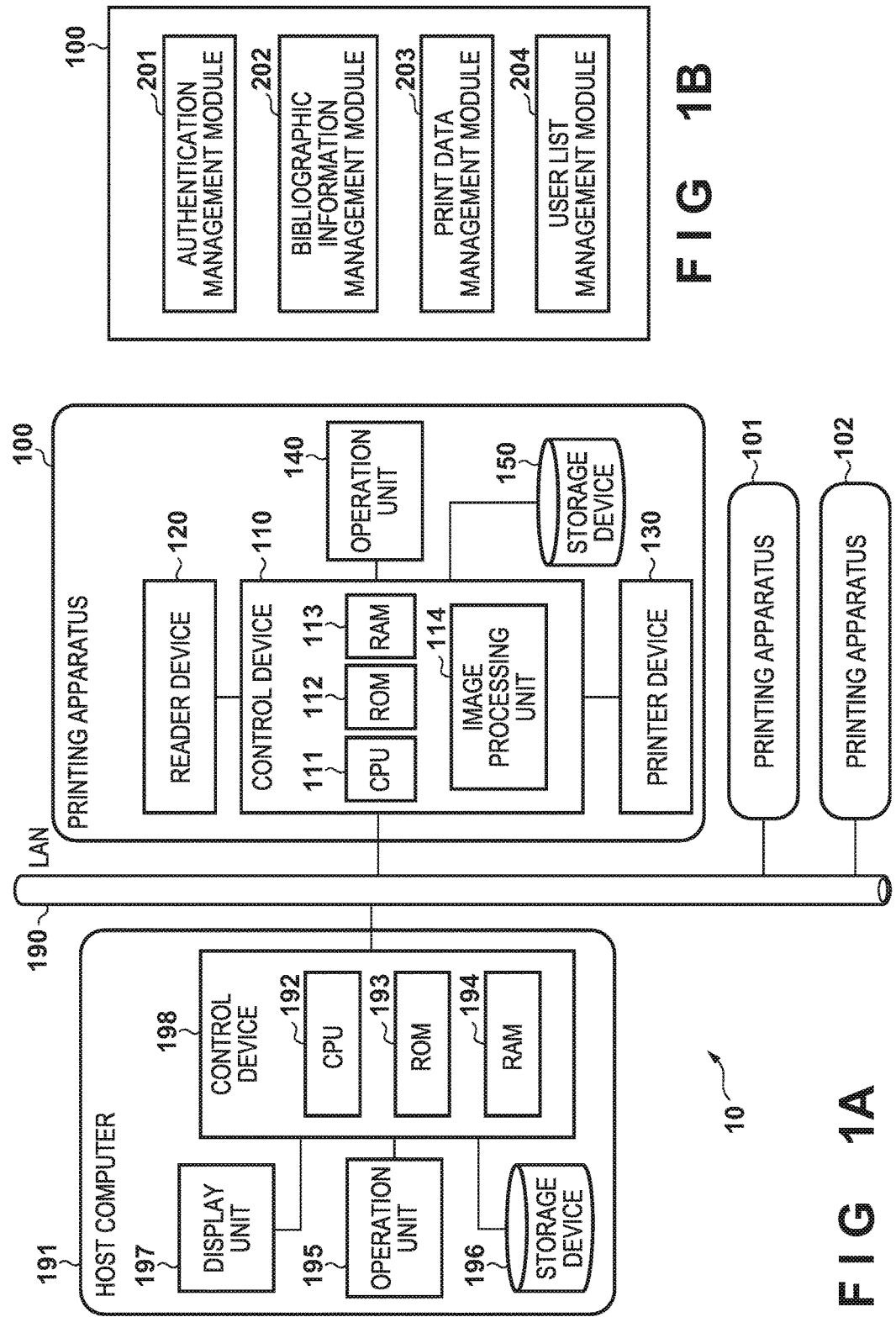

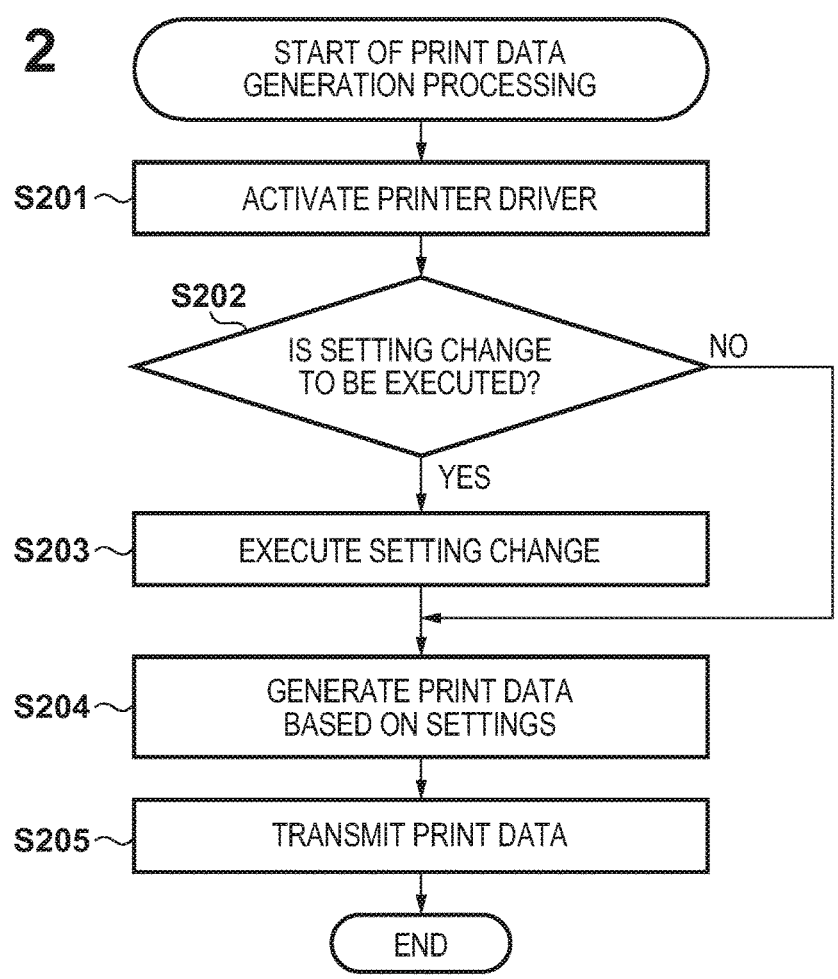
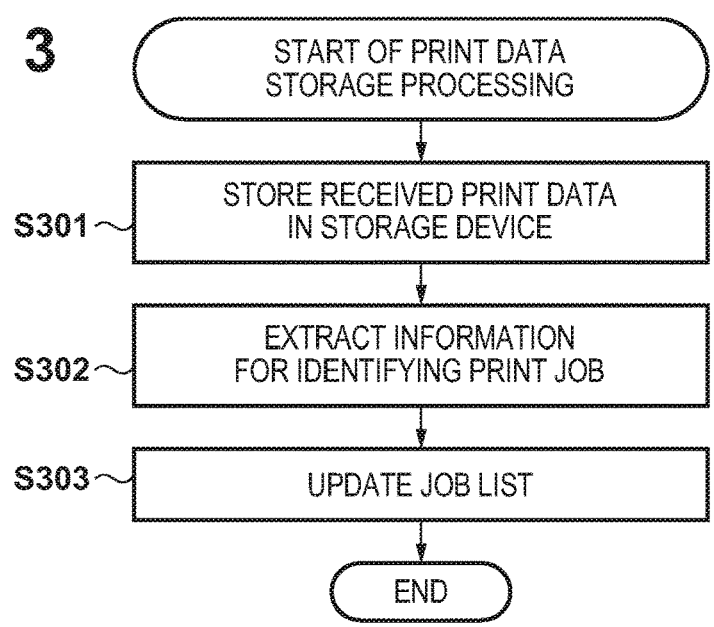

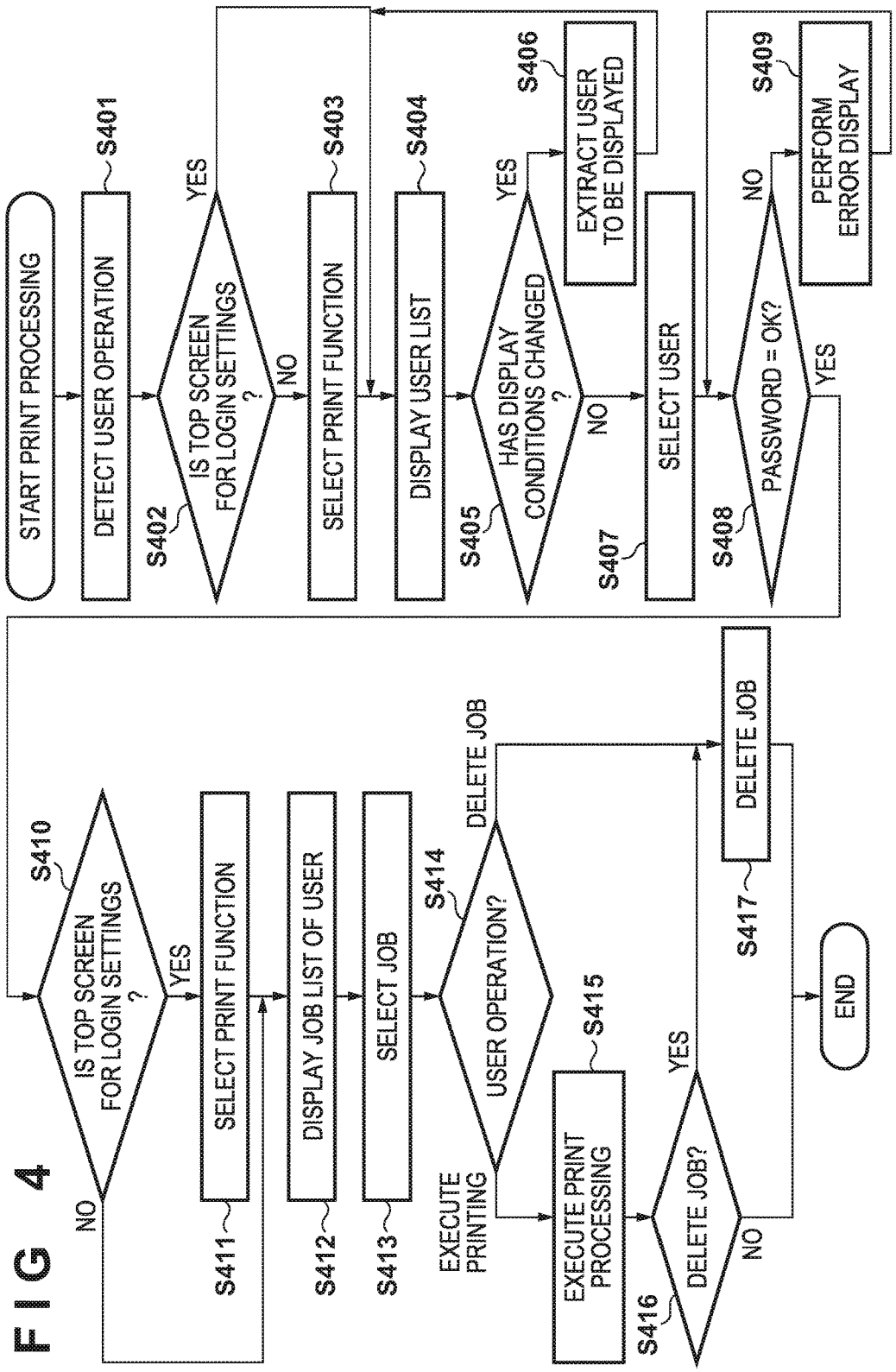

FIG 5

| USER NAME | PASSWORD |
|---|---|
| UserA | xxxx |
| UserB | xxxx |
| UserC | xxxx |
| UserD | xxxx |
| UserE | xxxx |
| UserF | xxxx |
| UserG | xxxx |
| UserH | xxxx |

| USER NAME 601 | PRINT DATA NAME 602 | STORAGE LOCATION 603 | COLOR MODE 604 | PAGE COUNT/ COPY COUNT 605 | DATE AND TIME OF STORAGE 606 |
|---|---|---|---|---|---|
| UserA | JobA | PRINTING APPARATUS 100 | COLOR | 5page/1 COPY | 2016/10/8 10:00:00 |
| UserA | JobB | PRINTING APPARATUS 100 | MONOCHROME | 2page/2 COPIES | 2016/10/8 10:03:00 |
| UserA | JobC | PRINTING APPARATUS 102 | COLOR | 6page/1 COPY | 2016/10/8 10:06:00 |
| UserB | JobD | PRINTING APPARATUS 101 | MONOCHROME | 1page/1 COPY | 2016/10/8 10:10:00 |
| UserG | JobE | PRINTING APPARATUS 100 | COLOR | 4page/10 COPIES | 2016/10/8 10:12:00 |
| UserC | JobF | PRINTING APPARATUS 102 | COLOR | 2page/1 COPY | 2016/10/8 10:14:00 |
| UserB | JobG | PRINTING APPARATUS 100 | COLOR | 2page/1 COPY | 2016/10/8 10:16:00 |

FIG 11

| USER NAME | ALL USERS | ALL JOBS | LOCAL | REMOTE |
|---|---|---|---|---|
| UserA | ○ | ○ | ○ | ○ |
| UserB | ○ | ○ | ○ | ○ |
| UserC | ○ | ○ |   | ○ |
| UserD | ○ |   |   |   |
| UserE | ○ |   |   |   |
| UserF | ○ |   |   |   |
| UserG | ○ | ○ | ○ |   |
| UserH | ○ |   |   |   |

IMAGE FORMING APPARATUS THAT RECEIVES BIBLIOGRAPHIC INFORMATION INCLUDING IDENTIFICATION INFORMATION OF PRINT DATA TRANSMITTED TO OTHER IMAGE FORMING APPARATUSES AND OBTAINS USER INFORMATION ASSOCIATED WITH THE PRINT DATA, AND RELATED DISPLAY METHOD AND NON-TRANSITORY COMPUTER-READABLE STORAGE MEDIUM STORING PROGRAM

This application claims the benefit of Japanese Patent Application No. 2017-029230, filed Feb. 20, 2017, which is hereby incorporated by reference herein in its entirety.

BACKGROUND OF THE INVENTION

Field of the Invention

The present invention relates to an image forming apparatus configured to execute a job, a display method, and a non-transitory computer-readable storage medium storing a program.

Description of the Related Art

In recent years, as network environments become widespread, it has become commonplace for a plurality of users to share and to use a plurality of image forming apparatuses. Along with this, there is increasing demand for "hold printing," in which an image forming apparatus executes printing after performing user authentication. For example, print data is accumulated in a storage area in an image forming apparatus, and printing is executed when a user designates the print data from a print job list of the user that is displayed after user authentication has been performed.

Also, instead of executing printing by uniquely designating an image forming apparatus from an information processing apparatus, there is increasing demand for "remote printing," by which it is possible to execute printing from a desired image forming apparatus in a printing system formed from a server and a plurality of image forming apparatuses that can communicate with each other. For example, print data is temporarily accumulated on a server, and printing is executed when the user designates the print data from a print job list of the user that is displayed after user authentication is performed on a desired image forming apparatus.

On the other hand, as an easier method of performing user authentication in an image forming apparatus, Japanese Patent Laid-Open No. 2012-254618 discloses a method in which user icons corresponding to the pieces of user information of accumulated print jobs are displayed, and the print job list of the user of the selected user icon is displayed.

In Japanese Patent Laid-Open No. 2012-254618, however, only print jobs that have been accumulated in a storage area in the image forming apparatus, as in the case of hold printing, are set as the display targets, and print jobs that have been accumulated in a storage area of a server or another image forming apparatus, as in the case of remote printing, are not set as the display targets. In addition, since the number of users will increase in accordance with the increase in the number of image forming apparatuses forming the printing system, the display of the user icons becomes complicated, thereby degrading user operability.

SUMMARY OF THE INVENTION

An object of the present invention is to eliminate the above-mentioned problems with the conventional technology. The present invention provides an image forming apparatus that improves the convenience of a user in a system that can execute a job on a network in which a plurality of apparatuses are connected to each other, a display method, and a non-transitory computer-readable storage medium storing a program.

According to one aspect, the present invention provides an image forming apparatus that can communicate with an external apparatus and includes a display unit configured to display information to a user, a storage unit configured to store data, and an image forming unit configured to form an image on a sheet, the image forming apparatus comprising a first obtainment unit configured to obtain user information associated with print data stored in the external apparatus, a second obtainment unit configured to obtain user information associated with print data stored in the storage unit, a first display unit configured to display, on the display unit, a first screen that includes an icon of a user associated with the print data stored in the external apparatus and an icon of a user associated with the print data stored in the storage unit, a second display unit configured to display, on the display unit, a second screen that includes identification information of print data associated with a user whose corresponding icon has been selected on the first screen, and an execution unit configured to cause the image forming unit to execute image formation based on the print data whose corresponding identification information has been selected on the second screen.

According to the present invention, it is possible to improve the convenience of a user in a system that can execute a job on a network in which a plurality of apparatuses are connected to each other.

Further features of the present invention will become apparent from the following description of exemplary embodiments with reference to the attached drawings.

BRIEF DESCRIPTION OF THE DRAWINGS

FIGS. 1A and 1B are block diagrams each showing the arrangement of a printing system.
FIG. 2 is a flowchart showing print data generation processing.
FIG. 3 is a flowchart showing print data storage processing.
FIG. 4 is a flowchart showing print processing.
FIG. 5 is a table showing user management information.
FIG. 6 is a table showing a print job list.
FIG. 11 is a table showing a list database.

DESCRIPTION OF THE EMBODIMENTS

Figure 7A:
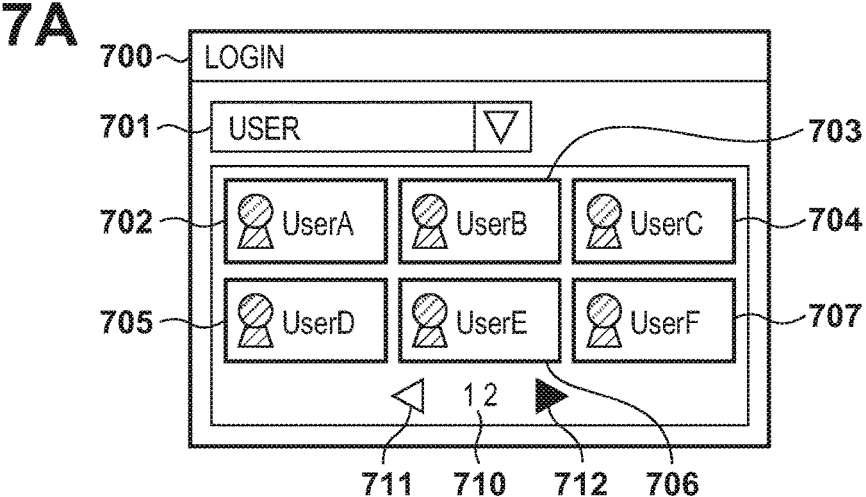
FIGS. 7A to 7E are views each showing a user list display screen.

Preferred embodiments of the present invention will now be described hereafter in detail with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will be omitted.

First Embodiment

FIG. 1A is a block diagram showing the arrangement of a printing system. As shown in FIG. 1A, a printing system 10 includes printing apparatuses 100, 101, and 102 and a host computer 191. Assume that a multi-function printer (MFP) integrating a plurality of functions, such as a printing function, a reading function, and a FAX function, will be used as each of the printing apparatuses 100, 101, and 102 to describe this embodiment. It is also possible, however, to use a printer of another arrangement, such as a single function printer (SFP) or a laser beam printer (LBP). The printing apparatuses 100, 101, and 102 and the host computer 191 are communicably connected to each other on a network 190, such as a local area network (LAN). Although only the three printing apparatuses 100, 101, and 102 are shown in FIG. 1A, there may be only one printing apparatus. Alternatively, four or more printing apparatuses may be connected to the network 190. Also, although only one host computer 191 is shown as the host computer, there may be a plurality of host computers connected to the network 190. Another apparatus, such as a server, may also be connected. Furthermore, the network 190 may be a wired network, a wireless network, or a combination of these two networks.

As the printing apparatuses 100, 101, and 102 have the same arrangement, a description will be given using the printing apparatus 100 as a representative example of the printing apparatuses 100, 101, and 102 hereafter.

The printing apparatus 100 includes a control device 110, a reader device 120, a printer device 130, an operation unit 140, and a storage device 150 (storage unit). The control device 110 is a control substrate (controller) that integrally controls the printing apparatus 100. The control device 110 includes a central processing unit (CPU) 111, a ROM 112, a RAM 113, and an image processing unit 114. The CPU 111 controls each block in the control device 110 via a system bus (not shown). For example, the CPU 111 can execute a function of the printing apparatus 100 by reading out a program stored in the ROM 112, the RAM 113, the storage device 150, or another storage medium, and executing the program. The ROM 112 stores, for example, a control program and tables and setting data necessary for executing each function of the printing apparatus 100. The RAM 113 is used, for example, as a work memory of the CPU 111. The image processing unit 114 executes various kinds of image processing, such as conversion, correction, editing, compression/decompression, and the like, on the read data generated by a reader device and on the image data received from the outside. The image processing unit 114 may be formed by hardware or may be implemented by software. The storage device 150 stores, for example, image data, device information, such as the mode and the license, and user information, such as an address book and customized information. Also, if the printing apparatus 100 is a server that manages the data of each apparatus in the printing system 10, the storage device 150 will hold the management information of the printing system 10.

The reader device 120 is formed as a scanner engine and generates read data by optically reading a document placed on a document table (not shown) or a document fed from an automatic document feeder (ADF). The printer device 130 is formed as a printer engine that supports various types of printing methods, such as the inkjet printing method and the electrophotographic method, and is an image forming unit that forms an image on a print medium (sheet). The operation unit 140 includes operation keys for accepting user operation and a liquid crystal panel for making various kinds of settings and displaying user interface screens and outputs the information of the accepted user operation, or the like, to the control device 110.

The printing apparatus 100 is not limited to the arrangement shown in FIG. 1A and includes other arrangements in accordance with the respective functions executable by the printing apparatus 100. For example, the printing apparatus may include an arrangement necessary for executing a FAX function and an arrangement to allow near field communication.

The host computer 191 includes a control device 198, an operation unit 195, a storage device 196, and a display unit 197. The control device 198 is a control substrate (controller) that integrally controls the host computer 191. The control device 198 includes a CPU 192, a read-only memory (ROM) 193, and a random access memory (RAM) 194. The CPU 192 controls each block in the control device 198 via a system bus (not shown). For example, the CPU 192 executes each function of the host computer 191 by reading out a program stored in the ROM 193, the RAM 194, the storage device 196, or another storage medium and executing the program. The ROM 193 stores, for example, various kinds of control programs, such as an operating system (OS) program, tables, and setting data necessary for executing each function of the host computer 191. The RAM 194 is, for example, used as a work memory of the CPU 192. The storage device 196 stores, for example, various kinds of application programs, data, user information, and device information.

The operation unit 195 includes a keyboard and a pointing device for accepting user operation and outputs the information of the accepted user operation, or the like, to the control device 198. The display unit 197 is, for example, a liquid crystal display and displays various kinds of user interface screens and information. FIG. 1B is a block diagram showing the software arrangement of the printing apparatus 100. The control device 110 of the printing apparatus 100 implements each function module shown in FIG. 1B by reading out a program stored in, for example, the ROM 112 to the RAM 113 and executing the program. As shown in FIG. 1B, the software of the printing apparatus 100 includes, as its function modules, an authentication management module 201, a bibliographic information management module 202, a print data management module 203, and a user list management module 204.

The authentication management module 201 is a function module for authenticating a user who is to use the printing apparatus 100. The information of the user who is to be authenticated by the printing apparatus 100 is registered in a user database in advance. The authentication management module 201 performs authentication by using the user database of FIG. 5. Note that user authentication may be performed via the network 190 by separately providing an authentication server that has the function of the authentication management module 201.

The bibliographic information management module 202 is a function module that manages the identification information of print data. In this embodiment, the printing apparatus 100 functions as a bibliographic information server that manages the bibliographic information of the overall printing system. Hence, the bibliographic information database of FIG. 6, which is managed by the printing apparatus 100, includes not only the identification information of print data stored in the printing apparatus 100 but also the identification information of print data stored in the printing apparatuses 101 and 102.

As shown in the flowchart of FIG. 3, when print data is transmitted to the printing apparatus 100, the bibliographic information management module 202 extracts the identification information from the received print data and registers the extracted information in the bibliographic database.

When print data is transmitted to each of the printing apparatuses 101 and 102, a piece of print data identification information is registered in the bibliographic information management module 202 in each printing apparatus. The printing apparatuses 101 and 102 each transmit the newly added bibliographic information to the printing apparatus 100 that is functioning as a bibliographic server. Upon receiving a new piece of bibliographic information from each of the printing apparatuses 101 and 102, the printing apparatus 100 adds each piece of information to the bibliographic information database. In the same manner, if a set of print data is deleted from each of the printing apparatuses 100, 101, and 102, each corresponding piece of bibliographic information is deleted from the bibliographic information database.

The print data management module 203 is a function module that manages the storage, the deletion, and the readout of input print data. In this embodiment, print data is managed in the printing apparatus in which the data has been input.

The user list management module 204 is a function module that manages each user icon displayed on the user list display screen. The user list management module 204 creates a list database based on the user database of FIG. 5 and the bibliographic database of FIG. 6.

FIG. 11 is a table showing an example of the list database. In FIG. 11, "○" indicates a user who is a list display target and "-" indicates user who is not a list display target. For example, in the list database of FIG. 11, User A, User B, and User G are displayed as users who hold local jobs. Note that the user list management module 204 may not create a list database but may extract the user based on the user database of FIG. 5 and the bibliographic information database of FIG. 6 at the stage when the user has selected a filter condition.

FIG. 2 is a flowchart that shows the print data generation processing in the host computer 191. The processing of FIG. 2 is implemented, for example, by the CPU 192 reading out a program stored in the ROM 193 to the RAM 194 and executing the program.

In step S201, the CPU 192 activates the printer driver upon accepting a print execution instruction from a user via an application that generates image data for printing. At this time, the CPU 192 loads initial values of various kinds of settings, such as print settings and image processing settings, stored in the ROM 193.

In step S202, the CPU 192 causes the display unit 197 to display a user interface (UI) screen of the printer driver. The UI screen displays buttons that can accept, from a user, a selection operation for changing various kinds of settings, such as print settings and image processing settings, or for executing printing without any changes in the settings. If the user selects to change the settings, the CPU 192 advances the process to step S203. If the user selects to execute printing without changing the settings, the process advances to step S204.

In step S203, the CPU 192 causes the display unit 197 to display a UI screen for accepting changes to various kinds of settings, such as the print settings and the image processing settings. At this time, the CPU 192 displays the initial values of the various kinds of settings loaded step S201 as the default values.

In step S204, upon receiving a notification of a print instruction from an application via the OS, the CPU 192 generates print data in accordance with the various settings that were confirmed on the UI screen. Here, the CPU 192 embeds the user information for identifying the user in the print data that is to be generated. In step S205, the CPU 192 transmits via the network 190 the print data to an apparatus that is to execute an operation according to this embodiment. In this embodiment, the CPU 192 transmits the print data to the printing apparatus 100. Subsequently, the processing of FIG. 2 ends.

In FIG. 2, the print data is generated by using the printer driver on the host computer 191. The print data may be generated, however, by another method. For example, the print data may be generated by another device, such as a mobile terminal, or the print data may be generated by an application without intervention of the printer driver. Also, instead of embedding the user information in the print data, another method, such as adding the user information to the print data when the print data is to be transmitted to the printing apparatus 100, may be used as long as the user information is associated with the print data.

FIG. 3 is a flowchart showing the print data storage processing in the printing apparatus 100. The processing of FIG. 3 is implemented by, for example, the CPU 111 reading out a program stored in the ROM 112 to the RAM 113 and executing the program. The processing of FIG. 3 starts when the printing apparatus 100 receives the print data transmitted from the host computer 191 in step S205 of FIG. 2.

In step S301, the CPU 111 stores the received print data in the storage device 150. Note that the CPU 111 may perform the following processes after storing the print data in the RAM 113 and may store the processed print data in the storage device 150 after the completion of the processing of FIG. 3.

In step S302, the CPU 111 extracts, from the print data stored in the storage device 150 in step S301, information for identifying the print job, such as a username, a print data name, and various kinds of print settings. Information related to the user, such as the username, is extracted from the user information embedded in the print data in step S204.

In step S303, the CPU 111 updates a print job list by storing, in the storage device 150, the information for identifying the print job extracted in step S302. Subsequently, the processing of FIG. 3 ends.

FIG. 6 is a table showing an example of a print job list 600 held in the storage device 150 of printing apparatus 100. The print job list 600 holds all of the pieces of print job information held in the respective printing apparatuses 100, 101, and 102 of the printing system 10. In this embodiment, the print job list 600 includes pieces of information for items, such as a username 601, a print data name 602, a storage location 603, a color mode 604, a page count/copy count 605, and a date and time of storage 606. When print data is transmitted from the host computer 191 to the printing apparatus 100 by the processing of FIG. 2, the pieces of information corresponding to the username 601, the print data name 602, the color mode 604, and the page count/copy count 605 are extracted in step S302 of FIG. 3. The storage location 603 of the print job list 600 indicates the name of the printing apparatus in which each job is held, and the date and time of storage 606 indicates the information of the date and time when each job was stored by the processing of FIG. 3. The print job list 600 is not limited to the information shown in FIG. 6, and may include other pieces of information that can be obtained as print settings.

In this embodiment, the printing apparatus 100 performs an operation to display the user list display screens shown in FIGS. 7A to 7E. In this case, when a print job is stored in the printing apparatus by the processing of FIG. 3, each of the other printing apparatuses 101 and 102 will notify the printing apparatus 100 of the corresponding print settings and the storage date and time information as an update request for the print job list 600. The CPU 111 of the printing apparatus 100 updates the username 601, the print data name 602, the color mode 604, and the page count/copy count 605 of FIG. 6 based on the notified print setting information. The CPU 111 of the printing apparatus 100 updates the storage location 603 and the date and time of storage 606 in FIG. 6 based on the notified storage date and time information. The printing apparatuses 101 and 102 can obtain the print job list 600 from the printing apparatus 100. In this case, the printing apparatuses 101 and 102 may make an obtainment request to the printing apparatus 100 or the printing apparatus 100 may distribute the print job list 600 at a predetermined time interval.

In addition, the storage device 150 of the printing apparatus 100 stores management information of users who are allowed to use the printing system 10. FIG. 5 is a table showing user list management information 500. As shown in FIG. 5, the user list management information 500 includes pieces of information related to items, such as a username 501 and a password 502. Other pieces of information for identifying a user may, however, also be included. Furthermore, as in the case of the print job list 600, the printing apparatuses 101 and 102 can obtain the user list management information 500 from the printing apparatus 100. In this case, the printing apparatuses 101 and 102 may make an obtainment request to the printing apparatus 100 or the printing apparatus 100 may distribute the user list management information 500 at a predetermined time interval.

In this embodiment, the user list management information 500 is held in the printing apparatus 100. The user management information may, however, be obtained in another information processing apparatus in the printing system 10, and password collation processing and authentication processing may be performed based on the user list management information 500. That is, data held in the apparatus that is to execute an operation according to this embodiment can be obtained by each apparatus in the printing system 10, and thus, the data is synchronized in each apparatus in the printing system 10.

FIG. 4 is a flowchart showing the print processing performed in the printing apparatus 100. The processing of FIG. 4 is implemented by, for example, the CPU 111 reading out a program stored in the ROM 112 to the RAM 113 and executing the program.

In step S401, the CPU 111 detects that a user has started to operate the operation unit 140. In step S402, the CPU 111 determines whether a TOP screen is for login settings. Here, if it is determined that the TOP screen is for login settings, the process advances to step S404. On the other hand, if it is determined that the TOP screen is not for login settings, in step S403 the CPU 111 displays, on the panel of the operation unit 140, a menu screen that includes function buttons, such as "copy", "print", "scan", and "settings". Here, assume that the CPU 111 has accepted selection of the function button for "print". After step S403, the process advances to step S404.

In step S404, the CPU 111 displays a user list display screen on the panel of the operation unit 140 based on the user list management information 500 and the print job list 600. Here, as shown in FIG. 7A, the user list display screens of all of the users are displayed as the initial screen.

FIGS. 7A to 7E are views each showing an example of a user list display screen 700. The user list display screen 700 includes a list switching switch (SW) 701. The list switching SW 701 is a display control menu for switching the display mode of the user list display screen 700 and includes, for example, an option to "display information of all of the users" and an option to "display only users holding a print job".

Figure 7B:
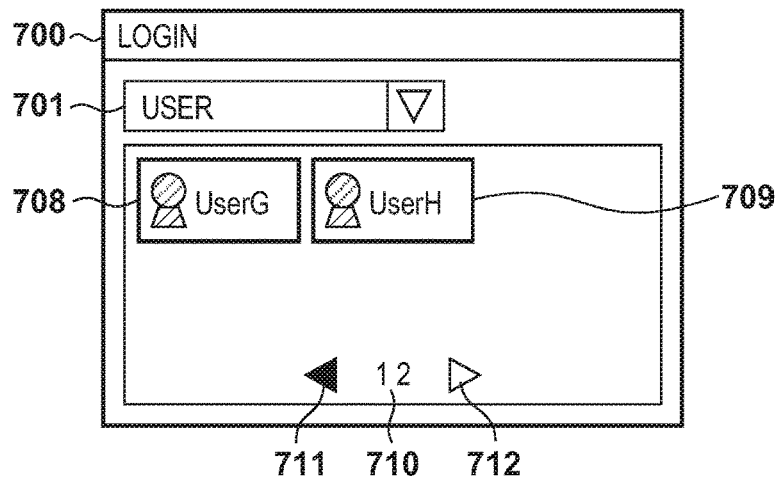

FIGS. 7A and 7B show an example of screens displayed when the option to "display information of all of the users" is selected by the list switching SW 701. In FIG. 7A, note, however, that only "user" is displayed as the option menu display. As shown in FIGS. 7A and 7B, a list of the icons of all of the users registered in the user list management information 500 is displayed. User icons 702, 703, 704, 705, 706, 707, 708, and 709 correspond to the usernames in the username 501. Since these user icons 702 to 709 cannot fit into one screen, information 710 indicating the page of the whole screen that is being displayed, a previous page transition button 711, and a next page transition button 712 are displayed together.

Figure 7C:
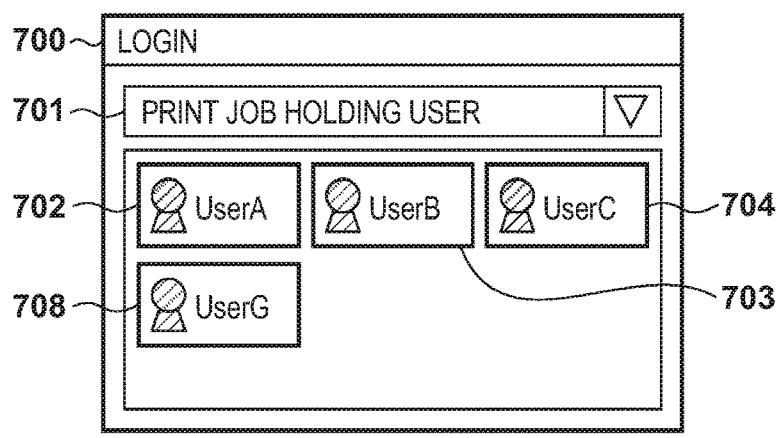

FIG. 7C shows an example of a screen displayed when the option to "display only users holding a print job" is selected via the list switching SW 701. In FIG. 7C, note however, that only "print job holding user" is displayed as the option menu display. As shown in FIG. 7C, the icons of users who hold print jobs are displayed based on the print job list 600. That is, of the user icons 702 to 709 corresponding to the usernames of the username 501, this applies to the user icons 702, 703, 704, and 708 of respective users who are holding the jobs shown in the print job list 600.

As shown in FIG. 7C, for example, the user icon 704 of a user who is storing print data in a printing apparatus other than the printing apparatus 100 is also displayed. Since the user count has been narrowed down, the display can be made within one screen, and it is possible to reduce the number of operations to display the user icon 708 that required transiting to the next page when the option to "display information of all of the users" is selected.

Figure 7D:
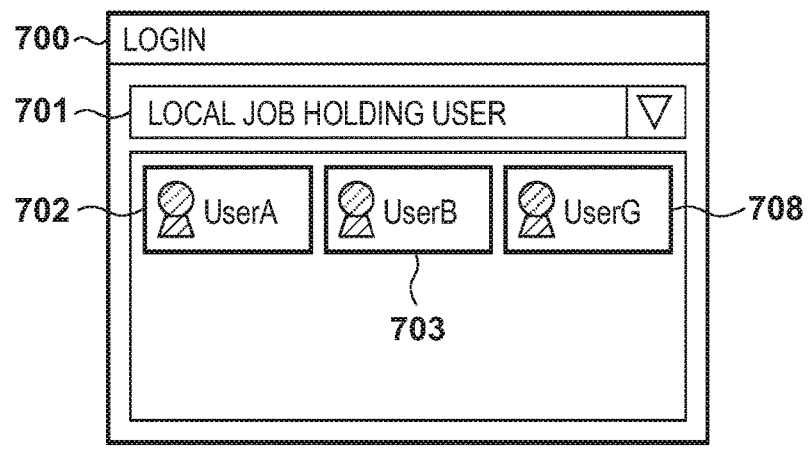
Figure 7E:
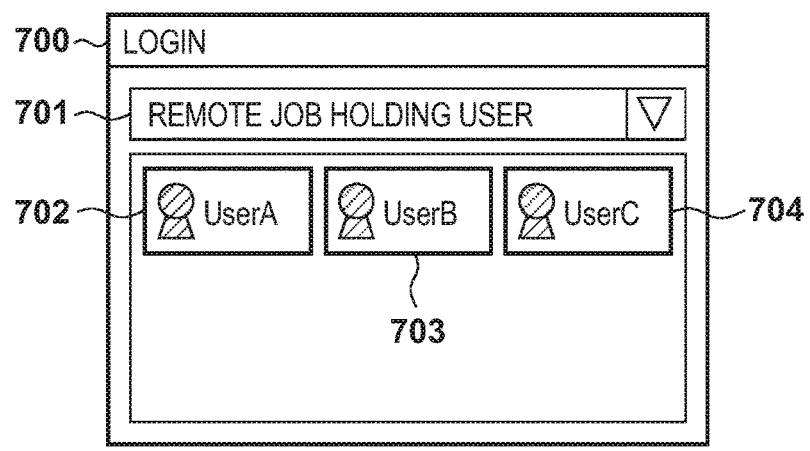

In FIG. 7C, a user is displayed when the user has a print job in one of the printing apparatuses 100, 101, and 102. That is, a user who holds a job (local job) stored in the printing apparatus 100 and a user who holds a job (remote job) stored in a printing apparatus other than the printing apparatus 100 are displayed together. As shown in FIGS. 7D and 7E, each user holding a local job and each user holding a remote job may, however, be displayed under separate filter conditions.

In step S405, the CPU 111 determines whether the user display list conditions have been changed. Here, a change in the user display list conditions is a change in the display mode by the list switching SW 701. If it is determined that the user display list conditions have changed, the CPU 111 extracts, in step S406, each user under the changed user list display conditions and returns to step S404 to update the user list display screen. On the other hand, if it is determined that the user display list conditions have not been changed, the process advances to step S407.

The processing following the designation of the option to "display only users holding a print job" shown in FIG. 7C will be described hereafter. Note that when the printing apparatuses 101 and 102 that do not manage the print job list 600 are to display the user list display screen 700 of FIG. 7C, the print job list 600 and the user list management information 500 will be obtained from the printing apparatus 100.

FIG. 7C displays each user who holds a print job in one of the printing apparatuses in the printing system 10. It may be set, however, so that users who hold a print job will be displayed for each corresponding printing apparatus. In this case, an option corresponding to each printing apparatus, for example, an option to "display users holding a print job in the printing apparatus 102" can be provided in the list switching SW 701, and the corresponding users can be displayed when the designation of this option has been accepted. For example, in the case of the print job list of FIG. 6, the icons of users A and C will be displayed.

In addition, the list switching SW 701 may be enabled only when the number of icons to be displayed based on the user list management information 500 exceeds a number that can be displayed on one screen. Furthermore, the list switching SW 701 may not only be used for narrowing down the number of icons, but may also be used for changing the display order so that the icon of a desired user will be displayed first. For example, if an option to "prioritize the display of users holding a print job in the printing apparatus 102" is designated, the arrangement of the icons may be changed to, for example, User A, User C, User B, and User D, etc.

Referring back to FIG. 4, in step S407, the CPU 111 accepts an icon selection instruction from the user via the operation unit 140. Here, assume that the user icon 702 has been selected.

In step S408, the CPU 111 causes the panel of the operation unit 140 to display a screen for inputting a user ID and a password. The CPU 111 accepts input from the user via the operation unit 140, collates the input user ID and the input password with the username 501 and the password 502 of the user list management information 500, and determines whether to permit the operation of the printing apparatus 100. Note that the user list management information 500 may be stored in an external information processing apparatus instead of the storage device 150, and the determination process of step S408 may be performed by this external information processing apparatus. If the operation of the printing apparatus 100 is permitted in step S408, the process advances to step S410. Otherwise, the process advances to step S409. In step S409, the CPU 111 causes the panel of the operation unit 140 to perform an error display operation to indicate that the input password is incorrect. After step S409, the process returns to step S408 to accept the input of a user ID and a password from the user again.

In step S410, the CPU 111 determines whether the TOP screen is for login settings. If it is determined that the TOP screen is not for login settings, the CPU determines that function selection is being performed and advances the process to step S412. On the other hand, if it is determined that the TOP screen is for login settings, the CPU 111 determines, in step S411, that function selection has not been performed and displays a menu screen including function buttons, such as "copy", "print", "scan", and "settings," on the panel of the operation unit 140. Here, assume that the CPU 111 has accepted the selection of the "print" function button. After step S411, the process advances to step S412.

In step S412, the CPU 111 displays, on the panel of the operation unit 140, a print job list of each user who has permission to operate the printing apparatus 100 among the print job list 600. The print job list of each user who has permission to operate the printing apparatus 100 from the print job list 600 will be simply referred to as a job list in order to discriminate it from the print job list 600.

Note that if the processing of FIG. 4 is to be performed in the printing apparatuses 101 and 102 that do not hold the print job list 600, each of the printing apparatuses 101 and 102 will make a request to the printing apparatus 100 to obtain the print job list 600.

Figure 8:
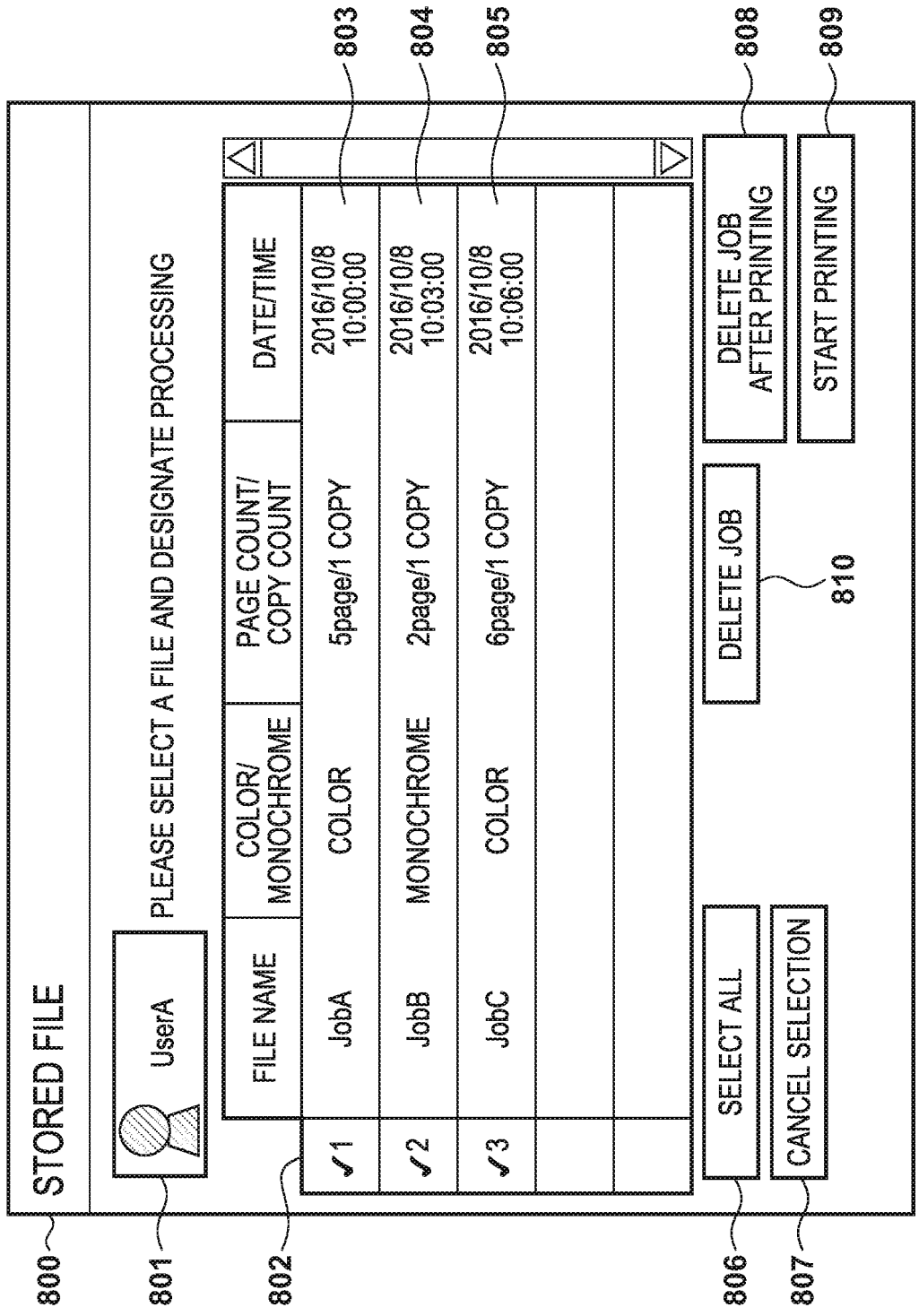
FIG. 8 is a view showing job list display.

FIG. 8 is a view showing an example of a job list display. A job list 800 displays a username 801 and checkboxes 802. Job display regions 803, 804, and 805 are regions to display information for the user to identify each print job, such as the file name of a print job, and each job display region also performs the role of a selection button for selecting a print job. Additionally, a "Select All" button 806, a "Cancel Selection" button 807, a "Start Printing" button 809, a "Delete Job after Printing" button 808, and a "Delete Job" button 810 are displayed.

In step S413, the CPU 111 accepts, from the user via the operation unit 140, at least one print job selection instruction from the job list. Here, assume that the print jobs have been selected by the user in the order of the job display regions 803, 804, and 805. The CPU 111 adds a checkmark and a value representing the processing order in the checkbox 802 of each selected print job and updates the display contents so that the user can confirm the selection and the processing order. Also, on the job list 800, the user can use the "Select All" button 806 to select all of the print jobs displayed on the job list 800 and use the "Cancel Selection" button 807 to cancel the selection of all of the print jobs.

In step S414, the CPU 111 determines the instruction operation from the user via the operation unit 140 to each print job selected in step S413. Here, if it is determined that the pressing of the "Start Printing" button 809 or the "Delete Job after Printing" button 808 has been accepted, the process advances to step S415. If it is determined that the pressing of the "Delete Job" button 810 has been accepted, the process advances to step S417.

In step S415, the CPU 111 generates an image by interpreting the print data corresponding to each print job selected in step S413 and transfers the generated image data to the printer device 130. The printer device 130 executes print processing by forming an image, based on the received image data, on a print medium, such as a sheet. In step S416, the CPU 111 determines whether deletion of each print job after the execution of the print processing has been designated. Here, in step S414, if it is determined that an instruction by the "Delete Job after Printing" button 808 has been accepted, the process advances in step S417. If it is determined that an instruction by the "Start Printing" button 809 has been accepted, the processing of FIG. 4 ends.

If it is determined that the pressing of the "Delete Job" button 810 has been accepted in step S414, or if it is determined that an instruction by the "Delete Job after Printing" button 808 has been accepted in step S416, the CPU 111 deletes, in step S417, each selected print job. Subsequently, the CPU 111 updates the print job list 600. After step S417, the processing of FIG. 4 ends.

As described above, according to this embodiment, it is possible not only to display each user managed in the system, but also to selectively display each user who satisfies a desired condition. For example, it is possible to narrow down the users from all of the users managed in the system to users who hold print jobs in another apparatus, and to display the resultant users in an icon list. After the selection of an icon, the job list held by the user of the selected icon is displayed. By setting such an arrangement, in a system in which a user is to select and to execute a desired job, it is possible to prevent the degradation of user convenience even if there is an increase in the number of users to be managed.

Second Embodiment

In the second embodiment, points that are different from the first embodiment will be described hereafter.

Figure 9:
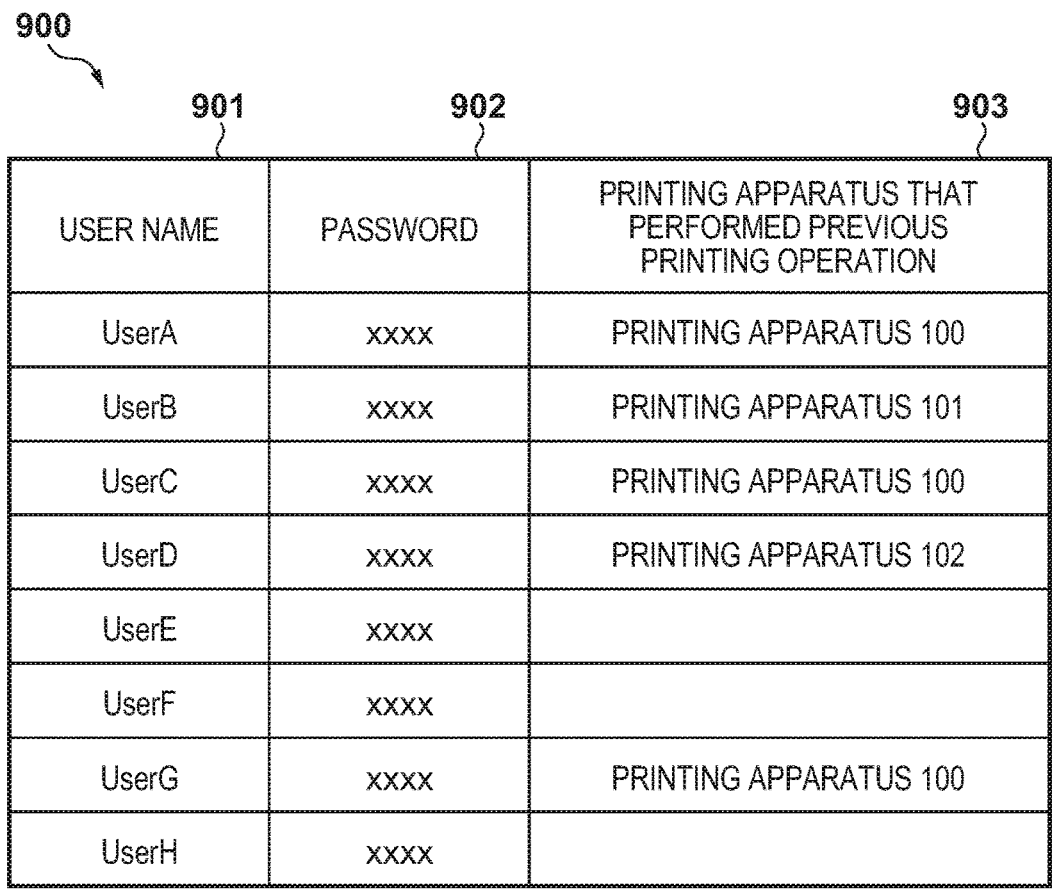
FIG. 9 is a table showing user management information.

FIG. 9 is a table showing an example of user management information 900 according to this embodiment. A username 901 and a password 902 of FIG. 9 correspond to a username 501 and a password 502 of FIG. 5, respectively. In this embodiment, the user management information 900 further includes information of an item 903. The item 903 indicates information of a printing apparatus that performed the previous printing operation for a user indicated in the username 901.

In this embodiment, when printing is executed in the printing apparatus, each of printing apparatuses 100, 101, and 102 in the printing system 10 notifies an apparatus that is to execute an operation according to this embodiment of the user information of the user who instructed the execution of the printing and the execution date and time information. Here, each of the printing apparatuses 100, 101, and 102 in the printing system 10 will notify the printing apparatus 100. A CPU 111 of the printing apparatus 100 will update the user management information 900, stored in a storage device 150, based on the notified user information and the notified execution date and time information. For example, if User C executes printing in the printing apparatus 102, notification of the user information and the execution date and time information will be transmitted from the printing apparatus 102 to the printing apparatus 100. Upon receiving the notification, the printing apparatus 100 will update the item 903 of User C in the user management information 900 to the "printing apparatus 102".

A case in which the processing of FIG. 4 is performed in this embodiment will be described hereafter. In step S404, a user list display screen 1000 of FIG. 10 is displayed.

Figure 10:
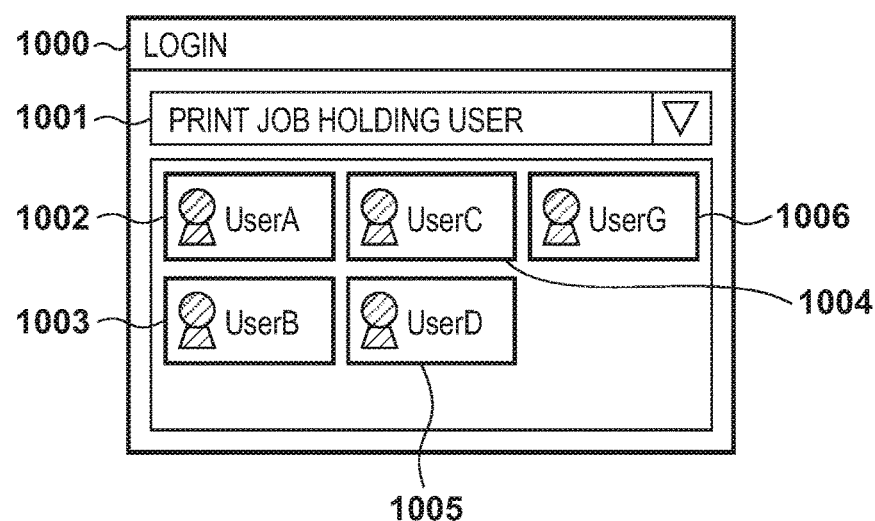
FIG. 10 is a view showing a user list display screen.

FIG. 10 is a view showing an example of the user list display screen 1000. The user list display screen 1000 includes a list switching SW 1001. The list switching SW 1001 corresponds to a list switching SW 701 of FIGS. 7A to 7E. In FIG. 10, an option to "display only users holding print jobs" has been selected by the list switching SW 1001. Accordingly, based on the user management information 900, the CPU 111 displays user icons 1002, 1003, 1004, 1005, and 1006 of users who are holding print jobs. Note, however, that in this embodiment, user icons are sorted and displayed in priority order so that the user icons 1002, 1004, and 1006 of users who have previously performed a printing operation in the printing apparatus 100 will be displayed first. In this manner, in this embodiment, each user who is more likely to perform printing in the printing apparatus 100 that displays the user list display screen 1000 will be prioritized and displayed on the display screen.

Although the information of the printing apparatus that performed the previous printing operation is used for the display operation as described above, information other than that related to printing, such as the login information, or the like, may be used. The icons may be sorted based on the information of a printing apparatus with a high use count or a high frequency of use.

Icon sorting based on the use count or the frequency of use will be described. When printing is performed in the printing apparatus, each of the printing apparatuses 100, 101, and 102 notifies the printing apparatus 100, which is the apparatus that executes the operation according to this embodiment, of the user information that instructed the execution and the execution date and time information. The CPU 111 of the printing apparatus 100 associates the notified user information and the notified execution date and time information with the printing apparatus that performed the printing, and stores the associated information as a piece of history information in the storage device 150. That is, the printing apparatus 100 holds the history information of the printing apparatus that performed the printing for each user who is being managed in the printing system 10. The CPU 111 of the printing apparatus 100 analyzes the history information and specifies, for each user, the printing apparatus with the highest frequency of use in, for example, a predetermined one month period. When displaying the user list display screen 1000, the CPU 111 of the printing apparatus 100 can sort and display the user icons in descending order of frequency of use of the printing apparatus 100. By such an arrangement, it is possible to prioritize and display the icons of users who have a high likelihood of using the printing apparatus 100. Furthermore, in such priority display, it is possible to perform not only sorting of the icons but to also perform display control in which the icons of users whose use of the printing apparatus is equal to or less than a predetermined frequency of use is not displayed.

In this embodiment, in step S415, the CPU 111 interprets the print data corresponding to the print job selected in step S413, performs image generation, and transfers the generated image data to the printing apparatus 100. The printing apparatus 100 executes print processing by forming an image, based on the received image data, on a print medium, such as a sheet. After the execution of the print processing, the CPU 111 updates the item 903 of the user management information 900 stored in the storage device 150.

As described above, according to this embodiment, in a printing apparatus that displays the user list display screen 1000, it is possible to accurately specify a user who has a high likelihood of using the printing apparatus and to prioritize and display the user.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus that can communicate with a plurality of other image forming apparatuses and that includes a display unit configured to display a display screen for a user, a storage unit configured to store data, and an image forming unit configured to form an image on a sheet, the image forming apparatus comprising:
   (A) at least one memory that stores instructions; and
   (B) at least one processor coupled to the at least one memory and configured to execute the instructions to function as:
      (a) a reception unit configured to receive, from each of the plurality of other image forming apparatuses, bibliographic information including identification information of print data transmitted to each of the plurality of other image forming apparatuses;
      (b) a first obtainment unit configured to obtain user information associated with the print data stored in the plurality of other image forming apparatuses, the user information being obtained based on the bibliographic information received by the reception unit;
      (c) a second obtainment unit configured to obtain user information associated with print data stored in the storage unit;
      (d) a first display unit configured to display, on the display unit, a first screen that includes an icon of a user associated with the print data stored in at least one of the plurality of other image forming apparatuses and an icon of a user associated with the print data stored in the storage unit;
      (e) a second display unit configured to display, on the display unit, a second screen that includes identification information of print data associated with a user whose corresponding icon has been selected on the first screen; and
      (f) an execution unit configured to cause the image forming unit to execute image formation based on the print data whose corresponding identification information has been selected on the second screen.

2. The image forming apparatus according to claim 1, wherein the at least one processor further executes the instructions to function as (g) an acceptance unit configured to accept a condition,
   wherein the first display unit displays an icon of a user who satisfies the condition accepted by the acceptance unit, and the icon displayed by the first display unit includes the icon of the user associated with the print data stored in at least one of the plurality of other image forming apparatuses and the icon of the user associated with the print data stored in the storage unit.

3. The image forming apparatus according to claim 2, wherein the acceptance unit can selectively accept a plurality of conditions.

4. The image forming apparatus according to claim 3, wherein the plurality of conditions includes a user who is being managed in a network including the image forming apparatus.

5. The image forming apparatus according to claim 3, wherein the plurality of conditions includes a user who holds a job in a network including the image forming apparatus.

6. The image forming apparatus according to claim 1, wherein the first display unit displays an icon of a user in priority order based on information.

7. The image forming apparatus according to claim 6, wherein the information includes at least one of an apparatus that holds a job of the user, an apparatus that executed a job of the user, and an apparatus use frequency of the user.

8. The image forming apparatus according to claim 6, wherein the information is obtained from an apparatus managing the information.

9. The image forming apparatus according to claim 8, wherein the at least one processor further executes the instructions to function as (g) a transmission unit configured to transmit, after the image forming unit has executed image formation based on the selected print data, history information of the executed image formation as the information to the apparatus managing the information.

10. A display method executed in an image forming apparatus that can communicate with a plurality of other image forming apparatuses and that includes a display unit configured to display a display screen for a user, a storage unit configured to store data, and an image forming unit configured to form an image on a sheet, the method comprising:
   receiving, from each of the plurality of other forming apparatuses, bibliographic information including identification information of print data transmitted to each of the plurality of other image forming apparatuses;
   obtaining user information associated with the print data stored in the plurality of image forming apparatuses, the user information being obtained based on the received bibliographic information;
   obtaining user information associated with print data stored in the storage unit;
   displaying, on the display unit, a first screen that includes an icon of a user associated with the print data stored in at least one of the plurality of other image forming apparatuses and an icon of a user associated with the print data stored in the storage unit;
   displaying, on the display unit, a second screen that includes identification information of print data associated with a user whose corresponding icon has been selected on the first screen; and
   causing the image forming unit to execute image formation based on the print data whose corresponding identification information has been selected on the second screen.

11. The display method according to claim 10, further comprising accepting a condition, wherein an icon of a user who satisfies the condition accepted is displayed, and the icon displayed includes the icon of the user associated with the print data stored in at least one of the plurality of other image forming apparatuses and the icon of the user associated with the print data stored in the storage unit.

12. The display method according to claim 11, wherein a plurality of conditions can be selectively accepted.

13. The display method according to claim 12, wherein the plurality of conditions includes a user who is being managed in a network including the image forming apparatus.

14. The display method according to claim 12, wherein the plurality of conditions includes a user who holds a job in a network including the image forming apparatus.

15. The display method according to claim 10, wherein an icon of a user is displayed in priority order based on information.

16. The display method according to claim 15, wherein the information includes at least one of an apparatus that holds a job of the user, an apparatus that executed a job of the user, and an apparatus use frequency of the user.

17. The display method according to claim 15, wherein the information is obtained from an apparatus managing the information.

18. A non-transitory computer-readable storage medium storing a program to cause a computer to execute a display method executed in an image forming apparatus that can communicate with a plurality of other image forming apparatuses and that includes a display unit configured to display a display screen for a user, a storage unit configured to store data, and an image forming unit configured to form an image on a sheet, the display method comprising:

receiving, from each of the plurality of other image forming apparatuses, bibliographic information including identification information of print data transmitted to each of the plurality of other image forming apparatuses;

obtaining user information associated with the print data stored in the plurality of other image forming apparatuses, the user information being obtained based on the receive bibliographic information;

obtaining user information associated with print data stored in a storage unit of the computer;

displaying, on a display unit, a first screen that includes an icon of a user associated with print data stored in at least one of the plurality of other image forming apparatuses and an icon of a user associated with print data stored in the storage unit;

displaying, on the display unit, a second screen that includes identification information of print data associated with a user whose corresponding icon has been selected on the first screen; and causing an image forming unit to execute image formation based on the print data whose corresponding identification information has been selected on the second screen.

* * * * *